United States Patent [19]
Harben, Jr.

[11] 3,747,159
[45] July 24, 1973

[54] POULTRY PICKING MACHINE

[75] Inventor: Grover S. Harben, Jr., Gainesville, Ga.

[73] Assignee: Gainesville Machine Company, Inc., Gainesville, Ga.

[22] Filed: July 16, 1971

[21] Appl. No.: 163,341

[52] U.S. Cl. ................................................. 17/11.1
[51] Int. Cl. ............................................ A22c 21/02
[58] Field of Search ...................................... 17/11.1

[56] References Cited
UNITED STATES PATENTS

| | | | |
|---|---|---|---|
| 3,273,198 | 9/1966 | Tomlinson | 17/11.1 |
| 3,483,589 | 12/1969 | Smorenburg | 17/11.1 |
| 3,585,675 | 6/1971 | Crane | 17/11.1 |
| 3,596,309 | 8/1971 | Vertegaal | 17/11.1 |

*Primary Examiner*—Lucie H. Laudenslager
*Attorney*—Newton, Hopkins & Ormsby

[57] ABSTRACT

Groups of flexible feather removing picking fingers are supported on a poultry picking machine adjacent each side of a predetermined path, with each group including a plurality of picking fingers operable for removing feathers from poultry or other fowl as they are conveyed therethrough along the predetermined path. The picking fingers of each group are supported on a number of rotatable support elements longitudinally spaced along the predetermined path in vertically spaced rows. The groups of picking fingers supported adjacent each side includes a top row of picking fingers rotatable about axes angularly disposed relative to the predetermined path and angularly disposed relative to a perpendicular axis, two intermediate rows of picking fingers rotatable about axes disposed substantially perpendicular to the predetermined path, and a bottom row of picking fingers rotatable about axes angularly disposed relative to the predetermined path and angularly disposed relative to the axes of the top and intermediate rows of picking fingers. The plurality of flexible feather removing picking fingers extend from opposing rotatable support elements into the path of travel of chicken or other fowl suspended headdown from a shackle and carried by a conveyor through the machine.

13 Claims, 6 Drawing Figures

POULTRY PICKING MACHINE

BACKGROUND OF THE INVENTION

This invention relates to poultry defeathering apparatus and more particularly to a picking machine with multiple finger action for removing the feathers from a chicken or other fowl, with a first plurality of fingers operable about substantially horizontal axes of rotation extending toward the path of travel of the chicken or other fowl passing through the machine, with a second plurality of fingers rotating about axes of rotation disposed parallel to the direction of travel.

Rotary drum-type chicken picking machines are well known in the art. These previous chicken picking machines customarily employ a plurality of rotary drums having a plurality of flexible rubber picking fingers extending from the periphery thereof to accomplish the removal of feathers from a chicken suspended head downward from a shackle carried by a conveyor. These previous machines have in most instances effectively removed feathers from most portions of the body of a chicken. However, several different machines, each having special arranged drums have frequently been necessary to completely accomplish the removal of feathers from all portions of a chicken or fowl. This is because previous chicken picking machines using a plurality of rotary drums to remove feathers from most portions of a chicken's body often do not completely remove the feathers of the hocks, shoulders and neck portions of the chicken.

Specifically, this invention relates to an improvement in a machine of a type described by C. V. Corn, et al., in U.S. Pat. No. 3,197,809, issued Aug. 3, 1965 and by G.W. Brown, et al., in U.S. Pat. No. 3,235,904, issued Feb. 22, 1966, and U.S. Pat. No. 3,402,424 issued Sept. 24, 1968. The machines described in each of the above mentioned patents are provided with a plurality of flexible rubber picking fingers which extend from opposing parallel circular plates into the path of travel of chicken or other fowl suspended head down from a shackle and carried by a conveyor through the machine. The plurality of flexible rubber picking fingers are rotated about axes of rotation perpendicular to the direction in which the chicken or other fowl is conveyed through the machine in such a manner that the body of the chicken or other fowl is engaged on both sides by fingers moving in the same direction as the direction of travel and by fingers moving in a direction opposite the direction of travel through the machine. This rotation of a plurality of flexible rubber picking fingers results in a circuit path of picking finger motion and causing each flexible picking finger to have a component of force when it strikes the body of a chicken or other fowl which is along the arc of a circle and a component of force which is radial because of centrifugal force, and in this manner the body of a chicken is cleaned of feathers by the machine. In the patent to Corn, et al the component of force of the picking fingers are operable in rotary paths which are disposed substantially parallel to the direction of travel. In the patent to Brown, et al. U.S. Pat. No. 3,402,424, the picking fingers are operable in rotary paths which are angularly disposed relative to the direction of travel.

Although the above described machines to Corn, et al. and Brown, et al. have proven to be effective in removing the feathers from all portions of the body of a chicken or other fowl in a generally satisfactory manner, they have exhibited a tendency toward bruising and burning the fowl especially whenever a chicken or other fowl being conveyed through the machine is of such proportions as to be more tightly engaged by the fingers than in the usual case.

In one of the above mentioned machines, the component of picking force of each of the flexible picking fingers would be oriented for rotation in substantially the same path and operable in a path parallel to the direction of travel of the chicken, and, in another of the machines, the component of picking force of each of the flexible picking fingers would be rotated in paths angularly disposed relative to the path of travel of the fowl through the picking machine.

To effectively remove all the feathers from all portions of the body of a chicken, a poultry processing operation could utilize one of the machines as described in each of the patents to Brown, et al and Corn, et al. In providing such an arrangement of poultry picking machines, the picking operation would extend over substantially a long distance. Further, when each of the machines described above is used independently at one portion of a predetermined path of travel of poultry, the poultry would become angularly orineted about a vertical axes relative to the picking fingers as they travel through one of the machines and would be angularly oriented about a different offset vertical axes as they travel through a second one of the machines. The above described angular of the poultry about the vertical axes would be effective to present certain portions of the body of a chicken against the feather removing fingers but would displace certain other areas of the body portion of the poultry away from the operation of the picking fingers. Therefore, merely using a plurality of the above described machines placed end to end will greatly improve a feather picking operation. However, this arrangement would not perform the feather removing operation in the most satisfactory and effective manner and along short distances of travel of poultry in a processing operation.

SUMMARY OF THE INVENTION

It is therefore a primary object of the invention to provide a poultry picking machine which will effectively and satisfactorily remove all the feathers from all the portions of the chicken during a processing operation.

Another object of this invention is to provide a poultry picking machine having a plurality of feather removing fingers angularly orineted relative to a predetermined path of travel of poultry passing through the machine for effectively contacting all portions of the body of poultry to remove feathers therefrom.

A further object of this invention is to provide a poultry picking machine which will remove feathers from the body portions of the poultry without bruising or burning the body thereof.

Still another object of this invention is to provide a poultry picking machine which presents a number of components of picking force effective for removing feathers in a processing operation.

A still further object of this invention is to provide a poultry picking machine including a flexible multiple finger picking action effective for removing feathers from the body portion of poultry or other fowl.

Another object of this invention is to provide a poultry picking machine having a number of groups of picking fingers located on opposite sides of a predetermined path of travel of poultry in a processing operation wherein the fingers are operable for effectively and satisfactorily removing feathers from the body portions of poultry or other fowl.

A further object of this invention is to provide a poultry picking machine wherein the frame support means is selectively adjustable whereby the multi-finger picking action can be set at a selected vertically spaced position relative to a processing line.

Still another object of this invention is to provide a poultry picking machine having multi-finger picking actions located on opposite sides of a predetermined path of travel of poultry through the machine and wherein means is provided for automatically adjusting the spacing of the fingers relative to said predetermined path.

A still further object of this invention is to provide a frame support means for supporting a number of picking fingers at predetermined locations relative to the path of travel of poultry in a processing operation.

A further object of this invention is to provide a drive means for effectively driving a number of operable picking elements in a poultry picking machine.

A still further object of this invention is to provide an automatic belt tensioning means for use in a drive system for a poultry picking machine.

Still another object of this invention is to provide a method of removing feathers from the body portions of a poultry as they are conveyed along a predetermined path of travel in a poultry processing operation.

An additional object of this invention is to provide a poultry picking machine which is simple in construction and operation, economical to manufacture and reliable in performance.

The foregoing and other objects are obtained by supporting a plurality of feather removing picking fingers adjacent each side of a predetermined path of travel of poultry during a processing operation. The improved feather picking operation of the present invention is accomplished by arranging the plurality of feather removing poultry picking fingers adjacent each side of the predetermined path into a number of vertically spaced rows of picking fingers, with the picking fingers of certain of the rows being rotatable about axes angularly oriented relative to the predetermined path and angularly oriented relative to perpendicular axes and certain other of the rows being rotatable about the axes disposed substantially perpendicular to the predetermined path, whereby the picking fingers will present a number of rotary paths of components of picking force which are disposed relative to the predetermined path so that the picking fingers will contact rub, and remove all the feathers from all body portions of poultry passing therethrough. A support frame means is provided with adjusting means for selectively positioning the plurality of picking fingers to a desired elevation relative to the predetermined path. Automatic control means is provided on the support frame means for effecting an automatic cycle of transverse movement of the picking fingers adjacent one side of the predetermined path relative to the picking fingers on the other side of the predetermined path.

These and other objects and advantages of the details of construction will become apparent upon reading the accompanying description of the illustrative embodiment of the invention with reference to the attached drawings wherein like reference numerals have been used to refer to like parts throughout the several figures, and wherein:

DESCRIPTION OF THE ILLUSTRATIVE EMBODIMENTS

Referring not to the drawings, the poultry picking machine will be described with reference to a main support frame 10, a selectively adjustable subframe 17 having a fixed support structure 32 and an automatically adjustable frame support structure 40 and further including a top row of operable picking fingers 61, two intermediate rows of operable picking fingers 62a, 62b, a bottom row of operable picking fingers 63 supported on the fixed support structure 32 and a top row of operable picking fingers 64, two intermediate rows of operable picking fingers 65a, 65b, and a bottom row of operable picking fingers 66 supported on adjustable frame support structure 40.

The function of the main support frame 10 is to provide a frame work for supporting the picking machine at a vertically spaced location relative to a support base. The function of the adjustable subframe means 17 is to provide a means for selectively adjusting the poultry picking mechanism to a number of vertically adjusted positions whereby the picking mechanism can be selectively set relative to a predetermined path of poultry conveyed therethrough by a conveying apparatus. The function of the fixed frame support means 32 is to support the rows of picking fingers 61–63 in a fixed position relative to a first side of the predetermined path of travel of poultry moving through the picking machine. The function of the automatically adjustable support frame 40 is to provide a support and means for automatically adjusting the transverse spacing between the rows of picking fingers 64–66 located on an opposite side of the predetermined path of travel relative to rows 61–63.

The function of the rows of picking fingers 61–66 is to present a number of picking fingers which are operable in a number of rotary paths of operation relative to the predetermined path of poultry traveling through the picking machine whereby the picking fingers will present a plurality of components of picking forces angularly disposed relative to the body portions of the poultry to provide a completely satisfactory and effective means for removing feathers from all body portions of poultry in a processing operation.

As shown in FIGS. 1-4, the main support frame includes four vertically oriented post means 11, 12, 13 and 14. The adjustable subframe 17 includes a first transvers beam 18 and a second transverse beam 19. Connected to opposite ends of the first and second transverse beams 18, 19 is a vertically oriented sleeve element 20. The first and second transverse beams 18 and 19 are connected together to form a substantially rectangular framework by means of two longitudinally extended beams 21, 22. Beams 21, 22 are connected to the sleeves 20 such that the adjustable subframe transverse beams 18, 19 are in substantially parallel relationship to each other and the two longitudinal beams 21, 22 are in substantially parallel relationship relative to each other. The sleeves 20 include an opening extending therethrough complementary to the vertical post elements 11-14. In an assembled relationship, the sleeves 20 are slidably supported on posts 11-14 whereby the subframe means 17 can be adjusted to a plurality of set positions along the post elements 11-14.

Adjustment of subframe means 17 is effected by means of a pair of conventional wench means 23. Wrenches 23 are located on an upper end of posts 11, 13. Each of the wenches 23 are of conventional construction and includes operable pulley means 24 which are selectively adjustable to a plurality of set positions. A chain element 25 is connected at one end to each of the pulleys 24 with the opposite ends of the chain being connected to a fixed element 26 located on a sleeve element 20 which is slidably supported on posts 11, 13. The adjusting mechansim for moving the subframe 17 vertically also includes a pair of second chain elements 27. One end of one of the chain elements 27 is connected to a post 11 by a fixed connecting element 28. Chain 27 extends upwardly from element 28 over a rotatable pulley element 29. Pulley 29 is rotatably supported by conventional bearing means (not shown) beneath the transverse beam 18. After the chain 27 passes over pulley 29 it extends along the length of transverse 18 and extends under and around a pulley 30. Pulley 30 is rotatably supported by conventional bearing means beneath an opposite end of transverse beam 18. Chain 27 extends from underneath pulley 30 upwardly along post 12 and is fixed at its opposite extended end to a bracket element 31 which is secured to the top of post 12. The second chain 27 is connected between a lower end of post 13 and an upper end of post 14 by means of pulleys 29, 30 as described above in regard to posts 11 and 12.

Figure 3A:
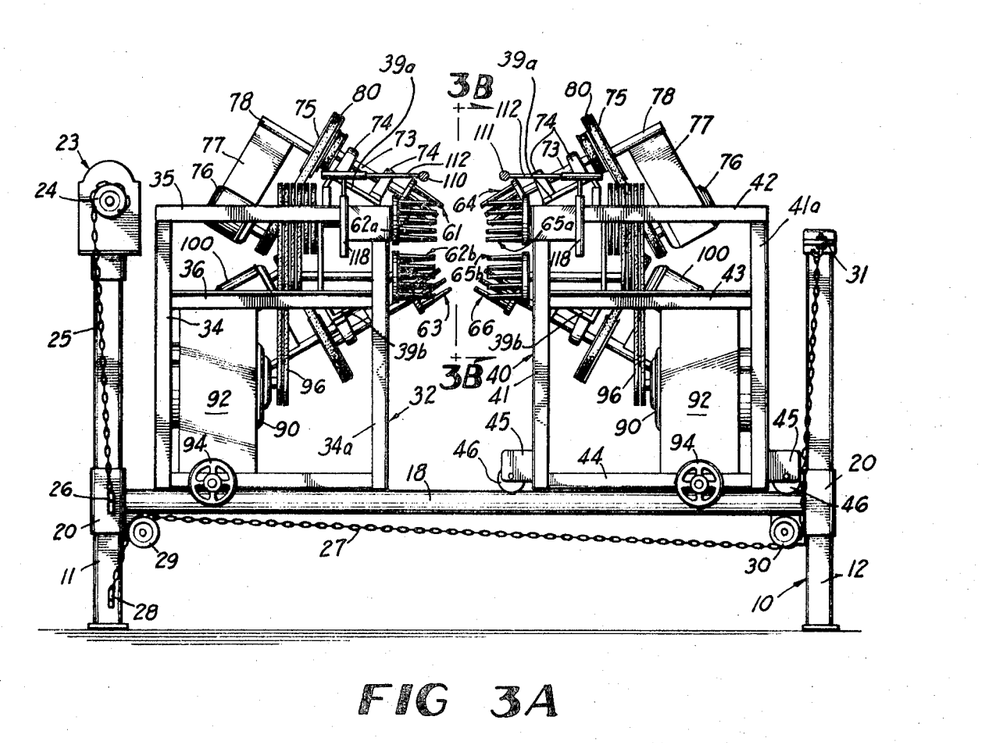
FIG. 3A is an end elevational view as seen from the left of FIG. 2 showing the automatically adjustable frame support structure in a rightmost adjusted position.

In an adjusting operation, the wench pulley mechanism 24 is rotated clockwise as shown in FIG. 3 whereby the chain element 25 will be wound around the pulley mechanism 24. A winding of chain 25 around pulley means 24 will pull the sleeve 20 and subframe 17 vertically upward along the posts 11, 13. As the subframe 17 moves upwardly due to the wench means 23, the pulley means 29 carried thereby will also be moved upwardly. As pulleys 29 are moved upward with the subframe 17, chains 27 will advance underneath pulley 30 and over pulley 29 whereby an opposite side of the adjustable subframe 17 which is supported by posts 12 and 14 will also be maintained in a substantially horizontally aligned position.

Reference is made to the above mentioned patent to Corn, et al., U.S. Pat. No. 3,197,809 for the details of construction of the wench and chain vertical adjustment mechanism.

Figure 1:
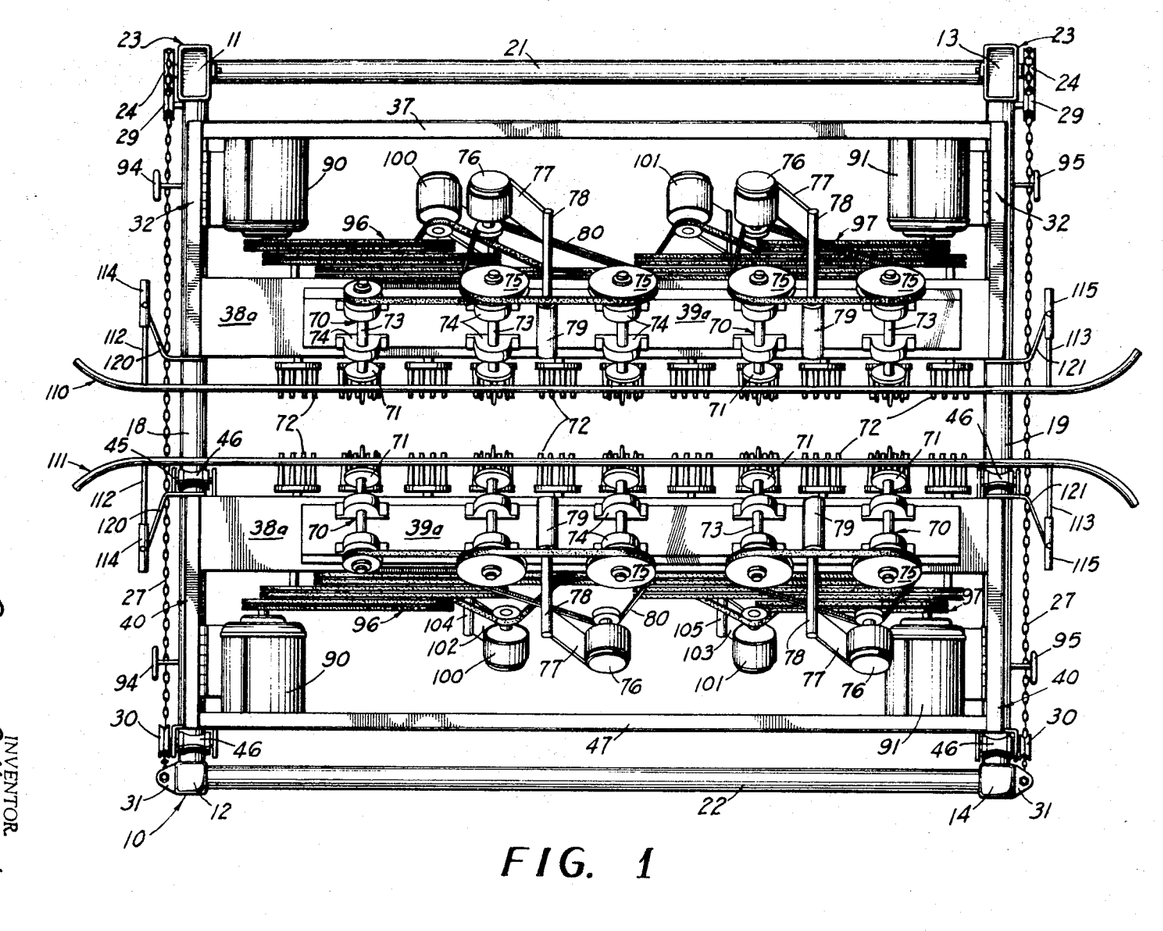
FIG. 1 is a top plan view of the poultry picking machine of the present invention, with certain parts being omitted for purpose of clarity.
Figure 3B:
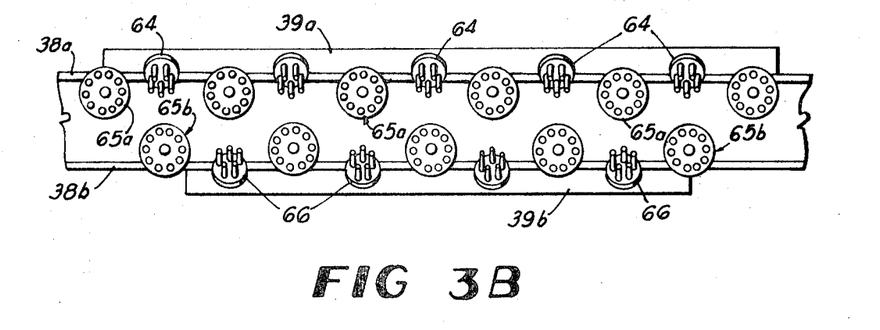
FIG. 3B is a vertical schematic view taken along line 3B—3B of FIG. 3A showing the arrangement of the picking fingers, with certain parts omitted for purpose of clarity.
Figure 3C:
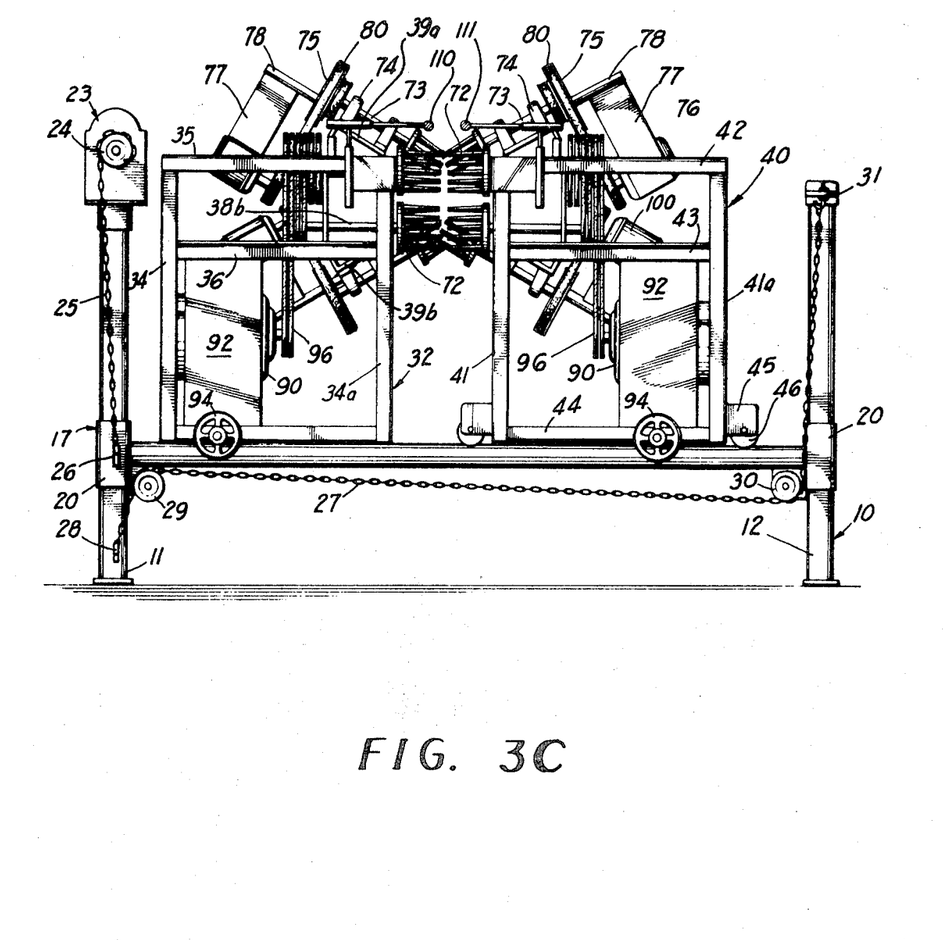
FIG. 3C is an end elvational view similar to FIG. 3A showing the automatically adjustable frame support structure moved to a leftmost adjusted position.

The adjustable subframe means 17 provides a supporting base for a pair of upstanding horizontally spaced frame support structures 32, 40, as shown in FIG. 1, 3A and 3C. The upstanding support frame structures 32, 40 are spaced to provide an upwardly opened channel therebetween which is oriented in longitudinal alignment relative to a conveyor mechanism used to advance poultry along a predetermined path in a processing operation.

As shown in FIGS. 1, 3A and 3C, the upstanding subframe structure 32 is fixed to the adjustable subframe 17 and includes a pair of end support means extending vertically upward from each of the transverse beams 19, 19. The end supporting means includes a pair of vertical members 34 which are fixed to each of the horizontal support beams 18, 19 and extend upwardly in substantially parallel relationship with the top edges of each pair being joined by a horizontal transverse connecting member 35. Located between cross-connecting member 35 and transverse beams 18, 19 is an intermediate cross-connecting member 36 which extends between the vertical members 34. As shown in FIG. 1, the two vertically extending end support frame means 34, 35, etc. are connected together by means of a longitudinal connecting beam 37 (FIG. 1) which extends between the upper extended end of the leftmost vertical members 34. Also extending between the end support members are a pair of horizontally disposed support plates 38a and 38b which extend therebetween in substantially parallel relationship and provide a supporting base for the picking apparatus as will be described in more detail hereinbelow. Formed on the two horizontally extending plates 38a and 38b are angularly disposed mounting plates 39a, 39b, respectively.

Figure 4:
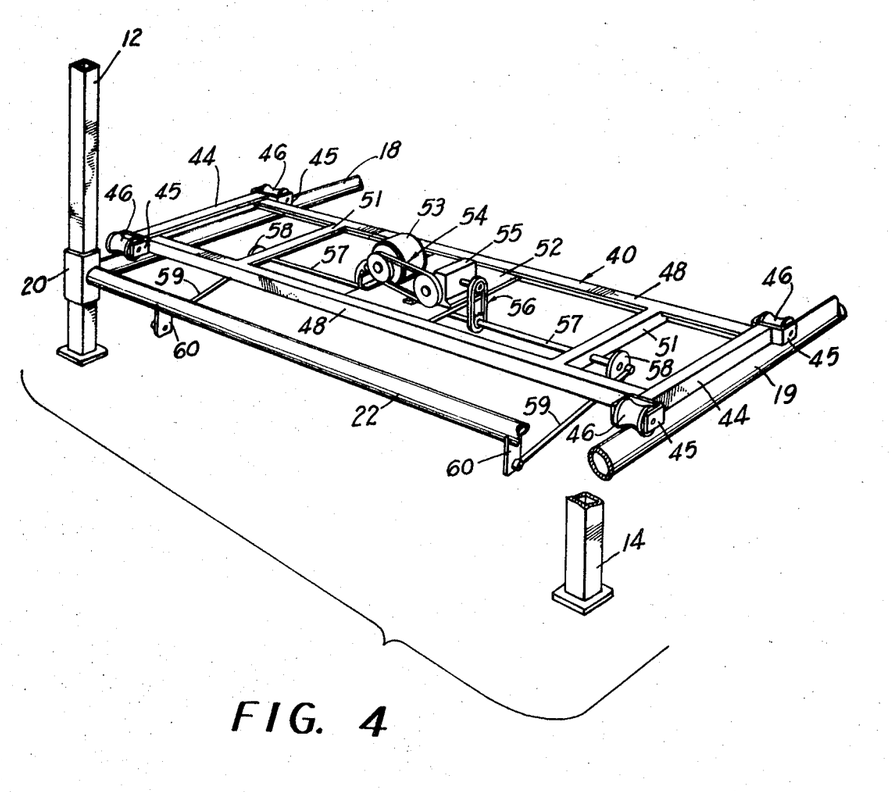
FIG. 4 is a fragmentary perspective view showing the control means for automatically adjusting the frame support structure relative to the main frame.

The horizontally spaced support structure 40 includes a pair of vertically extending horizontally spaced support members 41, 41a connected adjacent their top edge by a first cross-connecting member 42, connected intermediate their ends by a second cross-connecting member 43 and connected adjacent their bottom edge by a third cross-connecting member 44. Each of the vertically extending end members 41, 41a is provided with a horizontally extending bracket 45 detailed for rotatably supporting a roller means 46. The rollers 46 are supported in rolling engagement with an upper surface of transverse beams 18, 19, as shown in FIG. 4. The two end frame support members 41, 41a are connected by a top longitudinal beam 47 (FIG. 1) which extends between upper ends of the vertical members 41a.

As shown in FIG. 4, the frame structure 40 also includes two longitudinally connecting beams 48 which extend between a lower edge of the horizontal cross-connecting members 44. connected in spaced relationship along the longitudinal beams 48 are a pair of cross-connecting transverse frame members 51. The support structure 40 is rotatably supported by transverse beams 18, 19 for transverse adjustment therealong. Adjustment of the support frame means 40 along beams 18, 19 is effected by means of a conventional motor means 53 which is supported between beams 48 on a horizontal plate element 52. Power from motor 53 is delivered by a conventional belt and pulley means 54 to a gear box mechansim 55. The gear box 55 is supported on plate 52 in alignment with the motor 53. Drive from gear box 55 is delivered by a chain and sprocket drive mechanism 56 to a longitudinally extending drive shaft 57. Drive shaft 57 is rotatably supported by conventional bearing means (not shown) from the two transverse connecting members 51. Each of the extended ends of drive shaft 57 is provided with a rotary crank element 58. A rod means 59 is connected between each of the cranks 58 and a pair of fixed supporting plates 60 which are connected to the subframe longitudinally extending beam 22. In operation, a drive delivered from the rotor 53 will be delivered through the gear box 55 to the driven shaft 57 to thereby effect rotary movement of the cranks 58. A rotary movement of cranks 58 will operate against the connecting rods 59 to thereby cyclically reciprocate the support frame means 40 transversely along the transverse beams 18, 19. A reciprocating movement of the support structure 40 provides a cycle of transverse adjustment between the fixed support structure 32 and movable support structure 40.

As indicated hereinabove, the poultry picking machine of the present invention includes a number of rows of picking fingers 61–66. Each of the rows of picking fingers includes a number of rotary picking elements 70 (FIG. 1). A rotary picking element 70 includes a plate 71 having a plurality of flexible fingers 72 extending axially therefrom. Each of the plates 71 is fixed to one end of a rotatable shaft 73. Shafts 73 are supported by conventional bearing support means 74. Each of the shafts 73 is provided with a pulley 75 on its opposite ends for driving connection with conventional belt drive means, as will be described in more detail hereinbelow.

The fixed frame support structure 32 is provided with a top row 61, two intermediate rows 62a, 62b and a bottom row 63 of picking fingers 72 (FIG. 3A). The automatically adjustable frame support structure 40 is also provided with a top row 64, two intermediate rows 65a, 65b, and a bottom row 66 of picking fingers 72 (FIG. 3B). The rows of picking fingers 61, 62a, 62b and 63 are a mirror image of the rows of picking fingers 64, 65a, 65b and 66 shown in FIG. 3B. The support shaft 73, plates 71 and fingers 72 are supported on their respective frames whereby the picking fingers 72 extend outwardly therefrom in the direction of the channel formed between frame 32 and frame 40.

The support arrangement and drive means for supporting and driving the picking fingers on the support frame structures 32, 40 are identical in construction. Therefore, the support and drive means for only the support frame structure 40 will be described herein.

Figure 2:
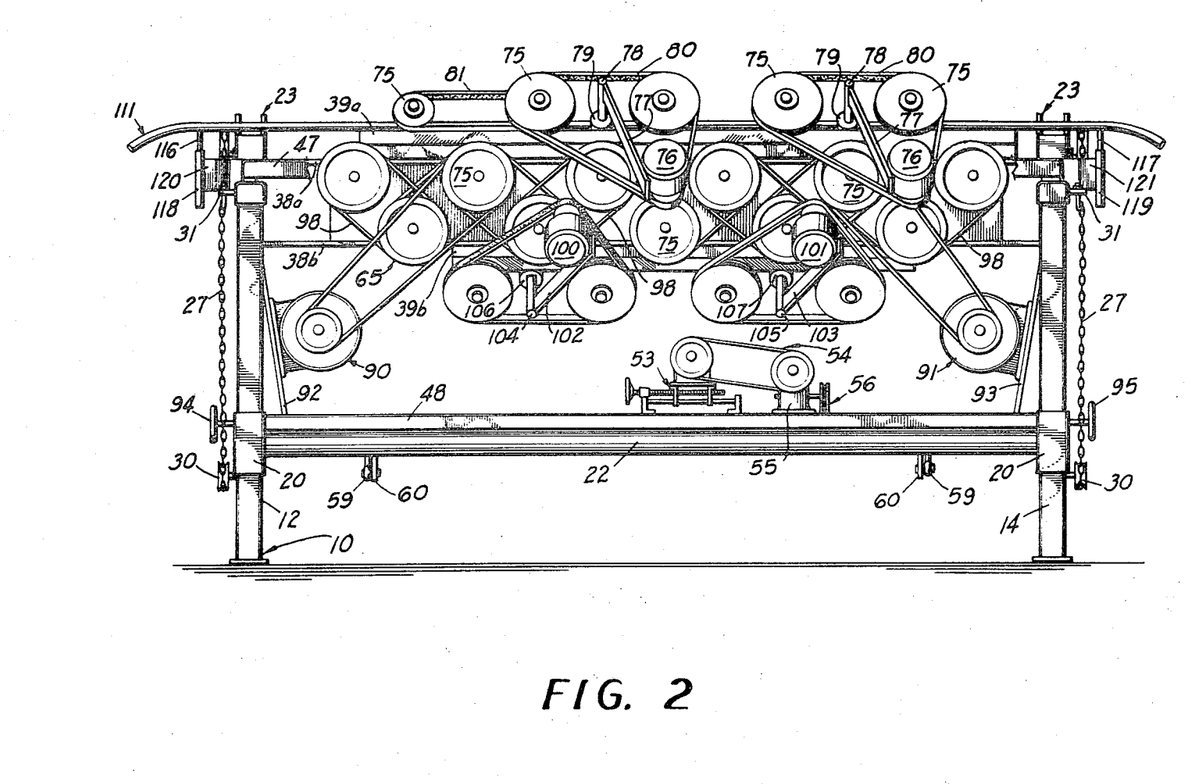
FIG. 2 is a side elevational view of the poultry picking machine of the present invention, with certain parts broken away and omitted for purpose of clarity.

As shown in FIGS. 2 and 3B, the top row of picking fingers 64 of the support frame structure 40 includes five longitudinally spaced picking elements 70. Rotary picking elements 70 of row 64 are mounted on the support structure 40 in longitudinally spaced relationship on the upper surface of an angular supporting plate 39a, as shown in FIGS. 2, 3A, 3B and 3C. The angular relationship of support plate 39a is detailed such that support shafts 73 will support the rotary plates 71 whereby axially extending picking fingers 72 will project into the upwardly opened channel defined between frames 32, 40 and adjacent the left side thereof, as seen in FIGS. 3A and 3B. The picking fingers 72 of row 64 are rotatable about axes angularly disposed relative to the longitudinal path of travel of poultry and angularly disposed relative to perpendicular axes.

Rotary movement of the row of picking fingers 64 is provided by means of a pair of motor drive means 76. The motors 76 are fixed to downwardly extending plates 77 which have their upper end connected to a support shaft 78. Support shaft 78 are journaled for rotary movement within sleeves 79. Sleeves 79 are fixed to the upper surface of angularly disposed support plate 39a. Drive from motors 76 is delivered by conventional belt drive means 80 which pass around a number of the pulleys 75 provided on an extended end of shaft 73. As shown in FIGS. 1 and 2, a drive from one of the shafts 73 is delivered by a belt 81 to the pulley means 75 which is connected to the left most rotatable picking elements 70. The motors 76 are supported for pivotal movement relative to sleeves 79 whereby the weight of the motors will keep the belt drive means 80 in sufficiently tight driving relationship at all times. However, should the rotary picking fingers 72 become blocked from movement for any reason, the belt drive means 80 would slip over the motor pulley drive due to the movably supporting relationship of the motor 76.

Referring now particularly to FIG. 2 and 3B, the two intermediate rows 65a, 65b of rotary picking fingers 72 are supported for operation on the support structure 40. The two rows 65a, 65b of picking elements are located below the top row 64. Each of the rows 65a, 65b includes a number of longitudinally spaced rotary picking elements 70. As shown in FIG. 3B, the rotary picking elements 70 of the row 65a are longitudinally spaced relative to and substantially centered between the rotary picking elements of row 64. The rotary picking elements 70 of the rows 65a are supported by the upper horizontal support plate 38a and the row 65b is supported by the lower horizontal support plate 38b. The picking elements 70 of the bottom row 65b are longitudinally spaced relative to the row 65a and are detailed in longitudinal spacing to be centrally located relative to the row 65a and vertically aligned relative to the picking elements of row 64. The plates 38a and 38b support the two intermediate rows 65a, 65b such that the fingers 72 will extend outwardly into the channel defined between the two support structures 32, 40. The picking fingers 72 of rows 65a, 65b are rotatable about axes disposed substantially perpendicular to the path of travel of poultry passing through the above mentioned channel.

Rotary movement of the picking fingers of rows 65a, 65b are provided by means of two conventional motor drive means 90, 91. The motors 90, 91 are fixed to plates 92, 93, respectively. Plates 92, 93 are pivotally attached adjacent their upper ends by conventional hinge means to the cross-connecting member 43 of the end support frame structures 40. Adjustable control means 94, 95 are provided with conventional threaded adjusting means for effecting pivotal movement of the motor support plates 93, 93 about their hinge axes to vary the tension on the belt drive means delivered from the respective motors. Conventional belt drive means 96, 97 are connected to the respective motors 90, 91 and to a pulley 75 of one of the rotary picking elements 70 in the row 65a. A number of conventional belt means 98 are provided for connecting the remaining pulleys 75 for the two intermediate rows 65a, 65b to the two driven pulleys 75 whereby the remaining rotary picking elements 70 will be driven in an operable picking movement. When a second belt means is utilized to effect a drive movement from one of the picking elements to a second one of the picking elements, the two picking elements are provided with additional conventional pulley means (not shown) for driving the additional rotary picking elements as required.

As shown in FIG. 3B, the bottom row 66 of picking fingers 72 is supported on the support frame structure 40 and includes a number of longitudinally spaced picking elements 70. Picking elements 70 of row 66 are mounted beneath the lower angularly disposed supporting plate 39b, as shown in FIGS. 2, 3A, 3B and 3C. The angular relationship of the support plate 39b is detailed such that shafts 73 will support the rotary plates 71 of row 66 whereby axially extending picking fingers 72 will project into the above mentioned channel defined between frames 32, 40. The picking fingers 72 of row 66 are rotatable about axes angularly disposed relative to the longitudinal path of travel of poultry and angularly disposed relative to the axes of rows 64 and 65 of operable picking fingers described herein above. As shown in FIG. 3B, the picking elements 70 of row 66 are longitudinally spaced along support plate 39b and are detailed in spacing to be centrally located between the picking elements of the row 65b and vertically aligned with picking elements of the row 65a.

Rotary movement of the picking fingers or row 66 is provided by means of a pair of motor drive means 100, 101. The motors 100, 101 are fixed to upwardly extending plates 102, 103 respectively, which have their lower end connected to support shafts 104, 105. Support shafts 104, 105 are journaled for rotary movement within sleeves 106, 107. Sleeves 106, 107 are fixed to the lower surface of the lower angularly disposed support plate 39b. Drive from motors 100, 101 is delivered by conventional belt drive means 108, 109 which pass around the pulleys 75 provided on an extended end of the shafts 73.

The motor support shafts 104, 105 are rotatably supported within the sleeves 106, 107 whereby movement of the motors 100, 101 about the axes of the support shafts 104, 105 will effect an automatic adjustment of the tension in the belt drive means 108, 109.

As described herein above, the adjustable support frame structure 40 includes a top row 64 having picking elements 70 supported for operable picking movement about axes angularly disposed relative to the path of travel of poultry passing through the machines. Supported on the support framework 40 immediately below row 64 are two intermediate rows 65a, 65b. Picking lements 70 of rows 65a, 65b are supported for operable picking movement about axes disposed substantially perpendicular to the path of travel of poultry passing through the machine. Supported below the two intermediate rows 65a, 65b is a bottom row 66 which is supported for operable picking movement about axes angularly disposed relative to the predetermined path of travel and angularly disposed realtive to the axes of row 64.

As shown in FIGS. 1, 2, 3A and 3C of the drawings, the poultry picking machine of the present invention includes four rows 61, 62a, 62b and 63 of operable picking elements 70 which are supported on the support framework structure 32. The details of supporting and driving the four rows of operable picking fingers 61, 62a, 62b and 63 will not be described herein since they are identical to the supporting and driving arrangement of the four rows 64–66 and reference is made to the above details of construction of rows 64–66 for an understanding thereof. The four rows 61–63 are substantially a mirror image of rows 64–66. The picking elements 70 of row 61 are supported in horizontally spaced relationship and aligned in vertical elevation with the picking elements 70 of row 64 and the fingers 72 of each of the rows 61, 64 are rotatable about axes angularly disposed relative to the predetermined path of travel of poultry passing therethrough and angularly disposed with regard to each other and axes perpendicular to the path of travel.

The picking elements of intermediate rows 62a, 62b are supported on the support frame structure 32 and are horizontally spaced and in vertical alignment with the two rows 65a, 65b supported on support structure 40. The four intermediate rows 62a, 62b, 65a and 65b are rotatable about axes disposed substantially perpendicular to the path of travel of poultry passing therethrough and with the axes of rows 62a, 65a substantially parallel to the axes of rows 62b, 65b.

Supported on the framework structure 32 immediately below intermediate rows 62a, 62b are the picking fingers of row 63. The picking fingers of row 63 are horizontally spaced and in vertical alinment with the picking fingers of row 66. The operable picking fingers of rows 63 and 66 are supported for rotation about axes angularly disposed relative to the path of travel of poultry and angularly disposed relative each other. In the above described supporting arrangement of the rows 61–66 of picking fingers 72, it is pointed out that the picking fingers of row 61 are rotatable about axes which are substantially parallel to the axes of rotation of the picking fingers of row 66 and the picking fingers of row 64 are rotatable about axes which are substantially parallel to the axes of rotation of the picking fingers of row 63.

As shown in FIGS. 1 and 2, means is provided for guiding movement of poultry through the above described upwardly open channel. The guide means includes a pair of guide bars 110, 111. One guide bar 100 is supported in a substantially horizontal position on frame structure 32 by means of two laterally projecting shafts 112, 113. Shafts 112, 113 are supported for laterally adjusting movement by sleeves 114, 115. Sleeves 114, 115 includes two downwardly extending support shafts 116, 117 which are adjustably supported by sleeves 118, 119. The sleeves 118, 119 are supported by plates 120, 121 which extend from frame structure 32.

The second guide bar 111 is supported on frame structure 40 in the same manner as guide bar 110 is supported on frame structure 32. The adjusting means for sleeves 114, 115, 118 and 119 includes conventional threaded locking screw means (not shown) for changing the vertical elevation and horizontal spacing of guide bars 110, 111.

OPERATION

In a poultry processing operation utilizing the novel picking machine of the present invention, the poultry picking machine will be oriented relative to a path of travel of poultry so that the channel defined between the four rows of fingers 61–63 on frame structure 32 and four rows of fingers 64–65 on frame structure 40 are in substantially longitudinal alignment therewith. After the poultry picking machine has been properly orineted relative to the longitudinal path of travel, the rows of picking fingers 61–66 are adjusted vertically until the fingers are in proper alignment with poultry conveyed along the predetermined path. The vertical adjusting movement of the fingers is effected by operation of the wench means 23 to raise and lower the sub-frame supporting structure 17.

After the poultry picking machine has been adjusted to the desired vertically set position, a picking operation is effected by energizing the power means to each of the above described motor drive means for effecting a driving movement of the rotary picking elements 70 of each of the rows of picking fingers. With the picking fingers 72 being driven about their operable axes of picking movements, a picking operation is ready to begin by conveying poultry to be picked along the predetermined path of travel through the channel defined between the longitudinally spaced rows of picking fingers.

As the poultry is moved along the path of travel, the motor drive means 53 will effect an automatic cycle of movement of the support framework structure 40 which would move the picking fingers 72 on frame structure 40 from an outwardly displaced position to an inwardly extened position and returned to the outwardly displaced position with each cycle of operation. During the picking operation, the picking fingers 72 of the adjustable framework structure is continually moved to effect an automatic extension and retraction of the picking fingers relative to the path of travel of poultry. The supporting relationship of rows of picking fingers and the reciprocating movement of certain of the picking fingers will effectively and satisfactorily remove all the feathers from all the body portions of the poultry conveyed therethrough along the predetermined path. The above described combination of rotary and reciprocating movement of the picking fingers will ensure that all the body portions of the poultry are contacted and effectively cleaned of feathers in a picking operation, without bruising or burning the body portions thereof.

It now becomes apparent that the above described illustrative embodiment of the poultry picking machine is capable of obtaining the above stated objects and advantages. It is obvious that those skilled in the art may make modifications in the details of construction without departing from the spirit of the invention which is to be limited only by the scope of the appended claims.

What is claimed is:

1. A poultry picking machine through which poultry or other fowl is conveyed along a predetermined path, comprising, in combination, a frame support means defining a channel in longitudinal alignment with said predetermined path; picking fingers arranged for removing feathers from poultry, means for supporting a plurality of said picking fingers on said frame support means adajcent each side of said channel, said plurality of picking fingers supported adjacent each side of said channel including a number of picking fingers rotatable about axes directed across said channel and angularly disposed relative to said predetermined path, and a number of picking fingers rotatable about axes directed across said channel and disposed substantially perpendicular to said predetermined path, and power operated means for continuously reciprocating the means for supporting a plurality of said picking fingers adjacent one side of said channel between a position outwardly displaced with respect to said channel and a position inwardly extending with respect thereto, thus effecting an automatic extension and retraction of said fingers relative to the path of travel of the poultry.

2. A poultry picking machine as described in claim 1 further characterized in that said plurality of picking fingers supported adjacent each side of said channel includes a plurality of longitudinal rows of picking fingers, with each row having a plurality of picking fingers and wherein the picking fingers of at least one of said rows are rotatable about axes angularly disposed relative to said predetermined path, the picking fingers of a certain other row being rotatable about axes disposed substantially perpendicular to said predetermined path and the picking fingers of still another of said rows being rotatable about axes angularly disposed relative to said predetermined path and angularly disposed relative to said one row of picking fingers.

3. A poultry picking machine as described in claim 2 further characterized in that said picking fingers of each of said rows of picking fingers are supported on a plurality of rotatable support elements.

4. A poultry picking machine as described in claim 3 further characterized in that said rotatable support element of each of said rows of said picking fingers are arranged on said frame means in longitudinally spaced rows of rotatable support elements.

5. A poultry picking machine as described in claim 3 further characterized in that said plurality of picking fingers of each of said rows are supported on a plurality of rotatable support elements, said rotatable support elements of each of said rows of picking fingers being longitudinally spaced on said frame with said rows of picking fingers being vertically spaced relative to each other.

6. A poultry picking machine as described in claim 5 further characterized in that the rotatable support elements of one row are longitudinally spaced and centered in substantially vertical alignment between the rotatable support elements of another row, 7. A poultry picking machine as described in claim 6 further characterized in that said vertically spaced rotatable support elements longitudinally centered between rotatable support elements of another row are supported in substantially vertical alignment with the rotatable support elements of still another row.

8. A poultry picking machine as described in claim 1 further characterized in that said plurality of picking fingers supported adjacent each side of said channel includes four vertically spaced rows of picking fingers, with each row having a plurality of picking fingers and wherein the picking fingers of the top row of said four vertically spaced rows of said picking fingers are rotatable about axes angularly disposed relative to said predetermined path, the picking fingers of two intermediate rows of said four vertically spaced rows being rotatable about axes disposed substantially perpendicular to said predetermined path and the picking fingers of the bottom row of said four rows being rotatable about axes angularly disposed relative to said predetermined path and angularly disposed relative to said top row of picking fingers.

9. A poultry picking machine through which poultry or other fowl is conveyed along a predetermined path comprising, in combination:

a. a frame support means defining a channel in longitudinal alignment with said predetermined path;

b. picking fingers detailed for removing feathers from poultry;

c. means for supporting a plurality of said picking fingers on said frame support means adajcent each side of said channel and wherein said plurality of picking fingers supported adjacent each side of said channel includes a number of picking fingers rotatable about axes directed across said channel and angularly disposed relative to said predetermined path, and a number of picking fingers rotatable about axes directed across said channel and disposed perpendicular to said predetermined path.

d. said plurality of picking fingers supported adjacent each side of said channel including four vertically spaced rows of picking fingers with each row having a plurality of picking fingers, and the picking fingers of the top row of said four vertically spaced rows of picking fingers being rotatable about axes angularly disposed relative to said predetermined path, the picking fingers of two intermediate rows of said four vertically spaced rows being rotatable about axes disposed substantially perpendicular to said predetermined path and the picking fingers of the bottom row of said four rows being rotatable about axes angularly disposed realtive to said predetermined path and angularly disposed relative to said top row of picking fingers; and e. said plurality of picking fingers of each of said rows being supported on a plurality of rotatable support elements, said rotatable support elements of each of said rows of picking fingers being longitudinally spaced on said frame, with the rotatable support elements of said top row being longitudinally spaced and substantially centered between the rotatable support elements of one of said intermediate rows.

10. A poultry picking machine as described in claim 9 further characterized in that the rotatable support elements of the said bottom row of picking fingers are longitudinally spaced and substantially centered between the rotatable support elements of a second one of said intermediate rows.

11. A poultry picking machine as described in claim 10 further characterized in that the rotatable support elements of one of said intermediate rows of picking fingers is longitudinally spaced and substantially centered between the rotatable support elements of said other intermediate row of picking fingers, and wherein the rotatable support elements of one of said intermediate rows are substantially vertically aligned with the rotatable support elements of said top row of rotatable support elements and the rotatable support elements of said bottom row of picking fingers are supported in substantial vertical alignment with the rotatable support elements of said other row of said intermediate rows of picking fingers.

12. A poultry picking machine as described in claim 11 further characterized in that said rotatable support element of said intermediate rows located adjacent one side of said channel are rotatable about axes substantially parallel to the rotatable support elements of the intermediate rows located adjacent an opposite side of said channel.

13. A poultry picking machine as described in claim 12 further characterized in that the rotatable support elements located in the top row adjacent one side of said channel are rotatable about axes substantially parallel to the rotatable support elements located in the bottom row adjacent an opposite side of said channel.

* * * * *